Dec. 19, 1939.  P. BELYAVIN  2,184,243
FILTER FOR PURIFYING LIQUIDS OR GASES
Filed Dec. 28, 1936   7 Sheets-Sheet 1

INVENTOR
Paul Belyavin,
BY
John B. Brady
ATTORNEY

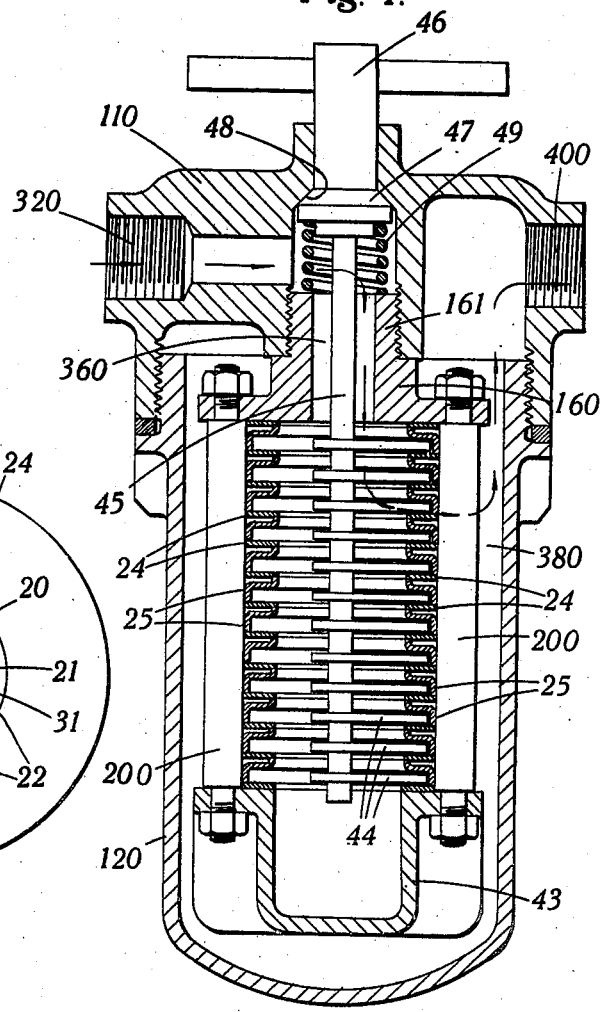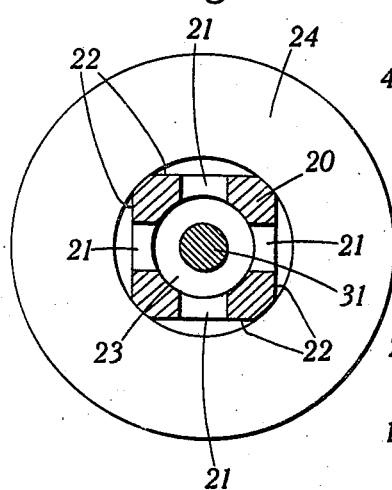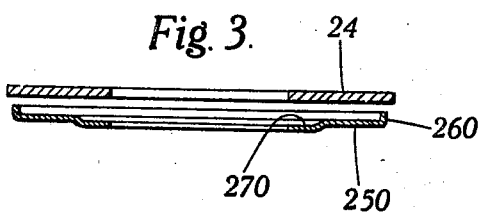

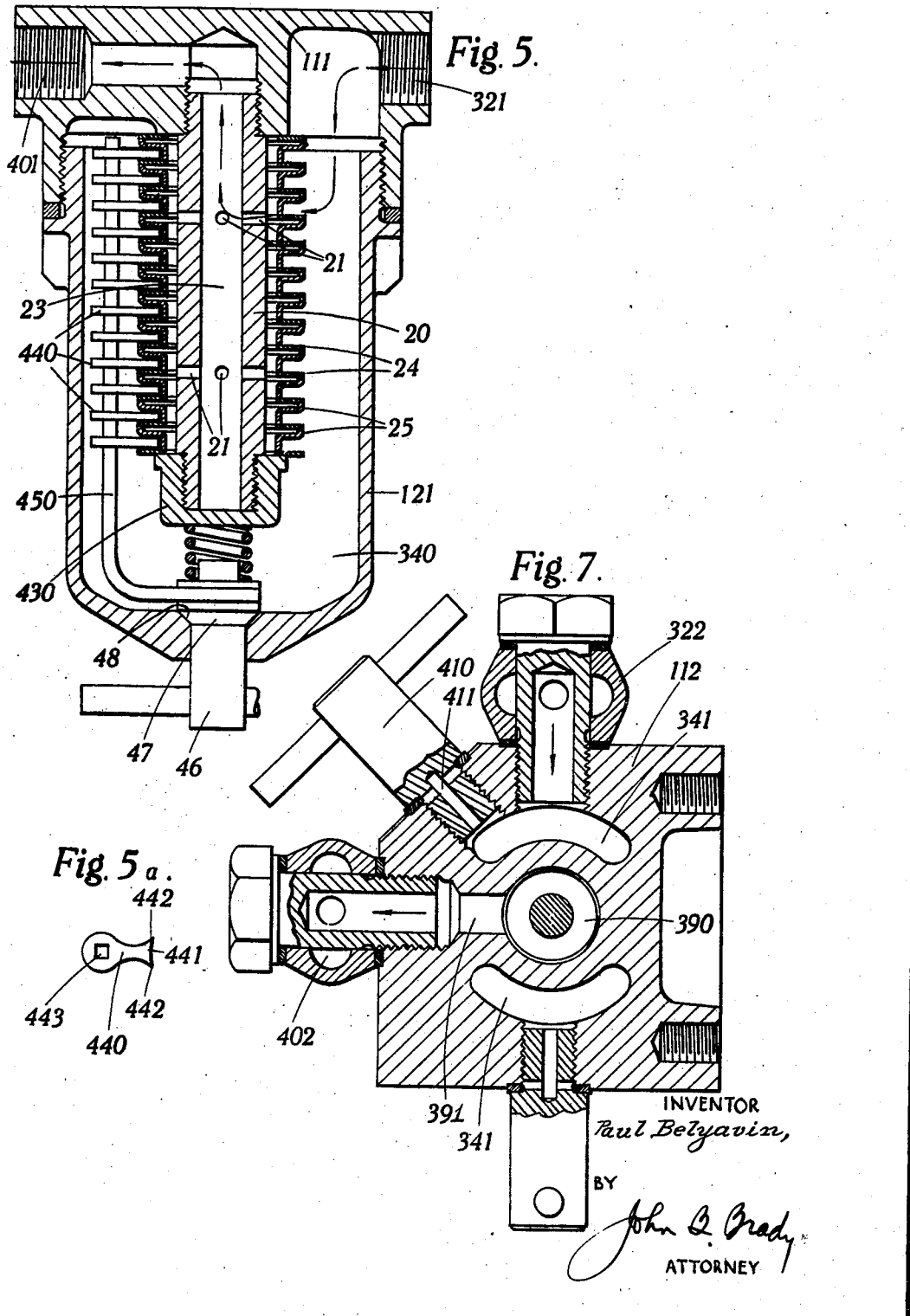

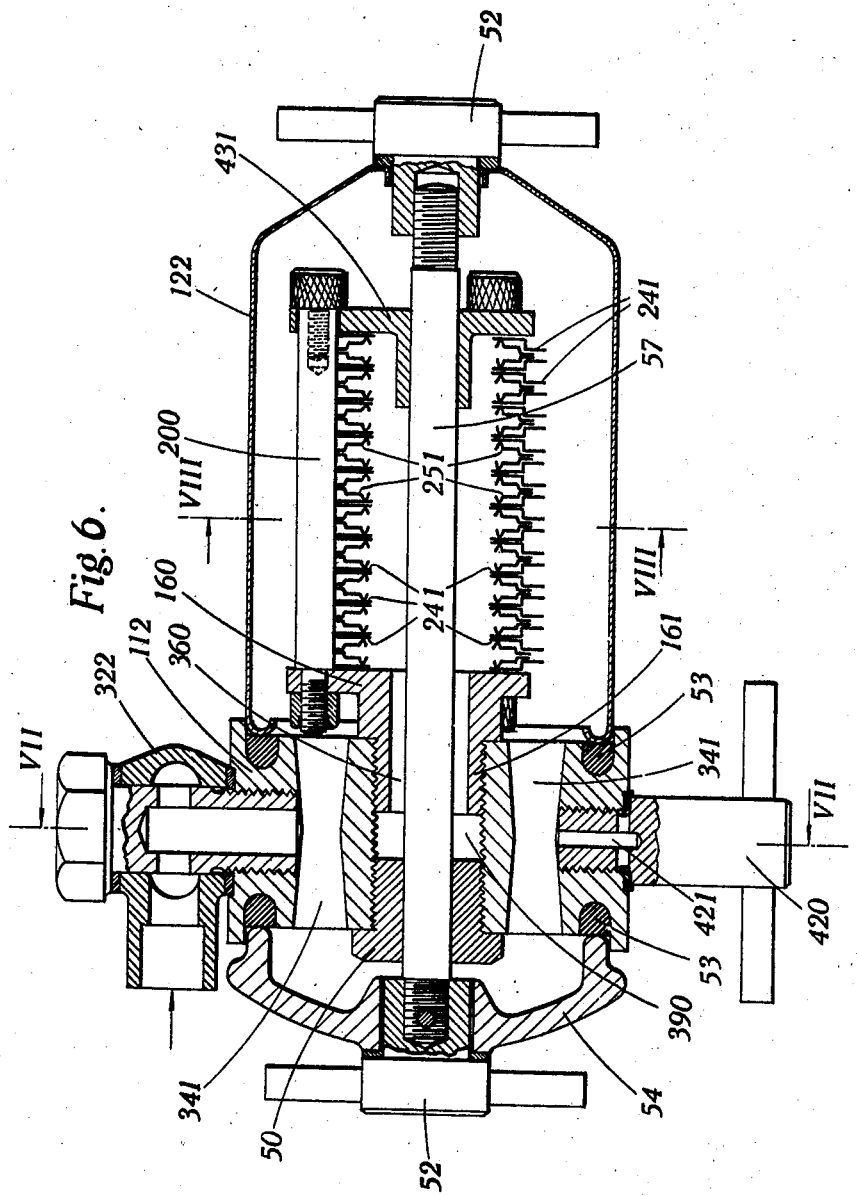

Dec. 19, 1939. P. BELYAVIN 2,184,243
FILTER FOR PURIFYING LIQUIDS OR GASES
Filed Dec. 28, 1936 7 Sheets-Sheet 5

INVENTOR
Paul Belyavin,
BY
John B. Brady
ATTORNEY

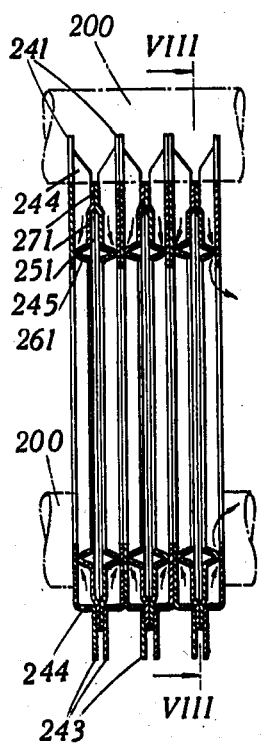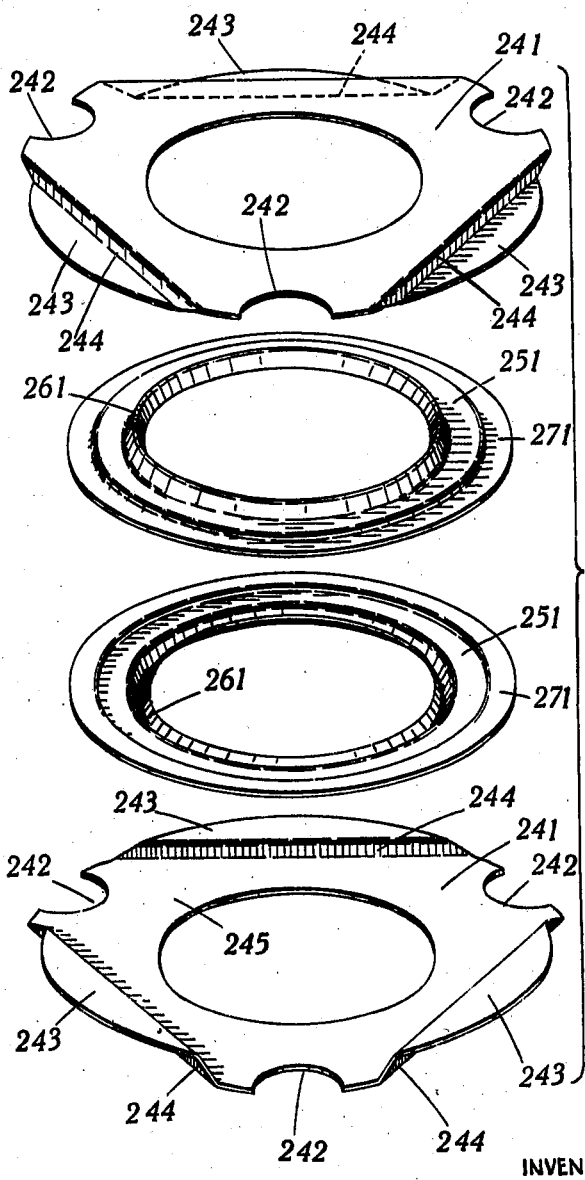

Patented Dec. 19, 1939

2,184,243

UNITED STATES PATENT OFFICE 2,184,243

FILTER FOR PURIFYING LIQUIDS OR GASES

Paul Belyavin, London, England, assignor, by mesne assignments, to Flexofiltration Limited, London, England Application December 28, 1936, Serial No. 117,954
In Great Britain February 6, 1936

12 Claims. (Cl. 210—169)

This invention relates to filters for purifying liquids or gases with a view to improving the efficiency of filtering and to facilitate the cleaning of the filters.

An object of the invention is to provide a filter for purifying liquids or gases having a series of elements and means resiliently pressing said elements together to set up oppositely acting forces at opposite margins of the elements, at least some of said elements being flexible under the pressure of passing fluid to afford filtering clearances at one of said margins.

Another object of the invention is to provide a filter for purifying liquids or gases, having a series of elements and means resiliently pressing said elements together to set up in said elements oppositely acting forces at opposite margins, adjacent couples of the elements resiliently contacting at an angle at one of said margins and being separable by flexure under the pressure of passing fluid to afford filtering clearance at said one margin.

A further object of the invention is to provide a filter for purifying liquids or gases, having a series of resilient elements, and supporting means constraining said elements so that they react each by exerting opposite forces at a pair of opposite margins, each of said elements being flexible under the pressure of passing fluid to afford a filtering clearance at one of said margins.

Preferably, in a filter according to the invention, the elements are annular and are disposed in a pile, with at least one supporting member extending axially of the pile constraining said elements laterally, and end members connected by said supporting member, which end members serve to press said elements together axially to set up oppositely acting forces at the inner and outer margins of the elements. For example, a single tubular member may extend axially through the interior of the pile and constraining the elements laterally, a plurality of external flat faces being formed of said tubular member and a plurality of radial apertures affording communication between the interior of said tubular member and the segmental spaces defined by said flat faces and the inner peripheries of the annular elements. Thus, the axial supporting member serves for the passage of fluid to be filtered either to the inside of the pile of elements when filtering is effected by passing the fluid outwards between the elements, or to enable extraction of the filtered fluid from the inside of the pile when filtering is effected by passing the fluid inwardly between the elements. Alternatively, at least three rods or equivalent supporting members may be disposed axially at equal intervals about the pile and engaging the outer peripheries of the elements to constrain them laterally, such spaced supporting members enabling free passage of the fluid either inwards or outwards through the pile of elements.

The setting up of oppositely acting forces at opposite margins of annular filtering elements is preferably ensured by the provision of a flange or an equivalent V-section ridge about one margin of an element to engage at an angle or substantially perpendicularly a plane margin of an adjacent element. Under a modified mode of assembly, such flanged, or ridged elements may be employed in opposed pairs, either in direct contact with one another or with the interposition of plane elements between their proximate edges. Evidently, many detail modifications of form of the elements may be made as will be appreciated from the description hereinafter given of various filters embodying the invention.

Another feature of the invention consists in the provision in a filter having annular elements of cleaning means. For example, knives may be mounted radially with reference to the axis of the pile of elements, each in the space between an adjacent pair of the elements, and without traversing the margins of said elements which mutually co-operate to afford the filtering clearances under the pressure of passing fluid, with means for relatively turning said knives and the pile of elements to remove deposited sludge from between the elements and enable such sludge to sink into a sump. Such knives or other cleaning means may be adapted to be moved either about the inside of the pile of elements when filtering is effected outwards or about the outside of the pile of elements when filtering is effected inwards.

In the majority of instances, an assembly of filter elements according to the invention will be enclosed within casing means, and the mounting of the assembly is preferably such that upon removal of one or more parts of the casing the filter assembly is removable as a unit for attention, e. g. for washing or for replacement of worn or damaged filter elements or cleaning means.

The means supporting an assembly of annular elements may be adjustable for varying the compression of said elements. For example, the end members may be connected to the axially extending supporting member or members by screw means with provision for the interposition of shims or other packing means.

Further, the axial resilience of a pile of annular elements may be attained either by making some or all of the elements themselves inherently resilient, or by applying a resilient constraint, through the intermediary of a compression spring, to at least one end of the pile.

The foregoing features of filters according to the invention will be rendered clearly comprehensible, and further features will become apparent from the following description, by way of example, of various embodiments, with reference to the accompanying drawings, wherein:—

Fig. 2 is a transverse section on the line II—II of Fig. 1,

Figure 1:
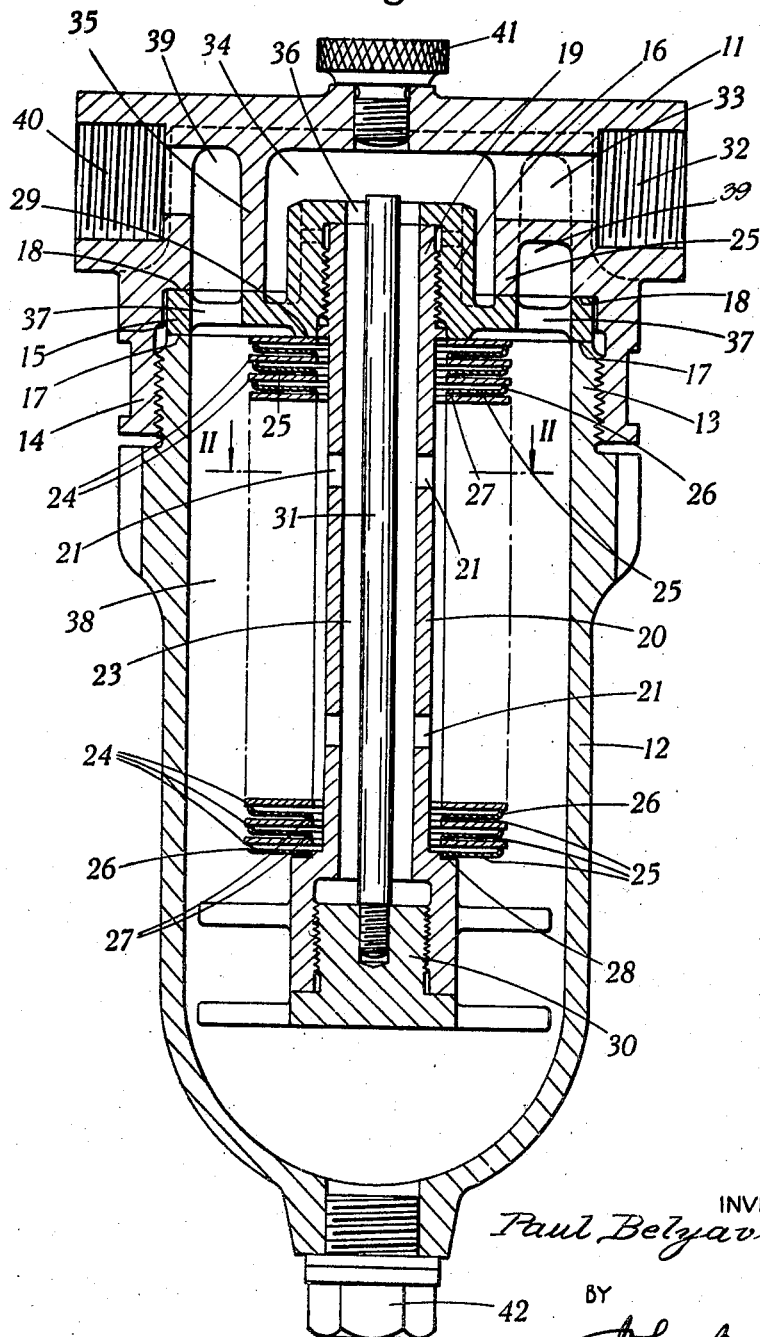
Fig. 1 is an axial section of a vertically disposed filter.
Figure 8:
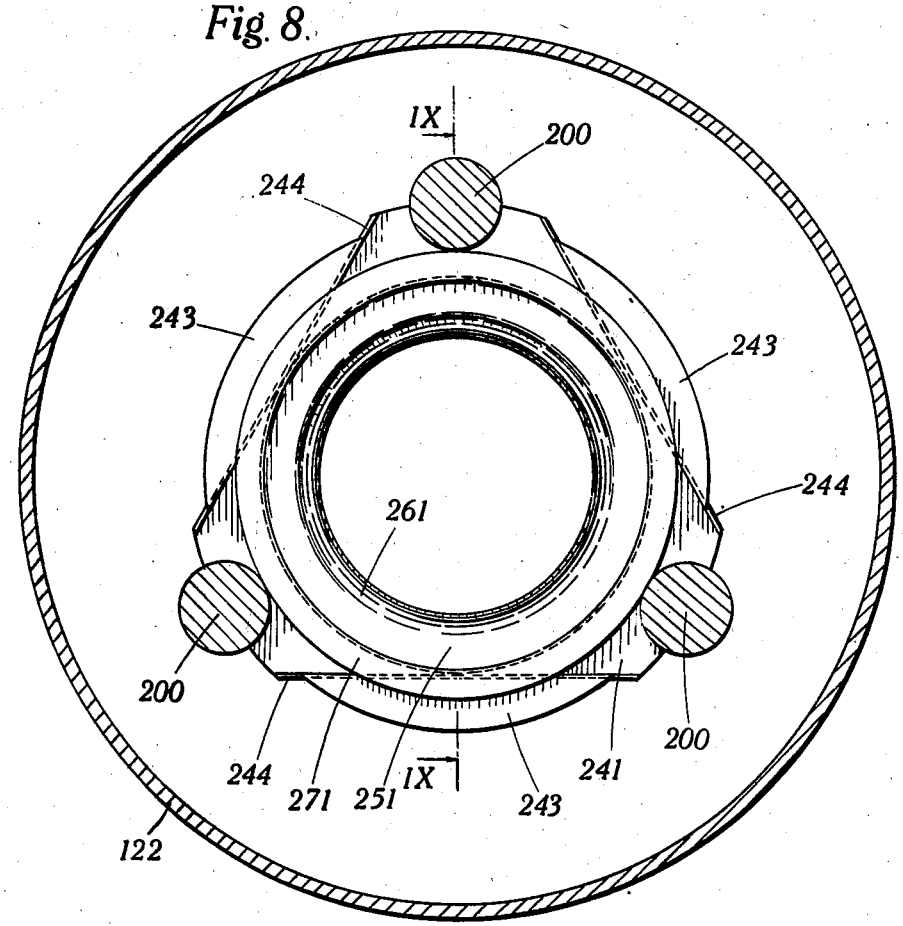
Figure 12:
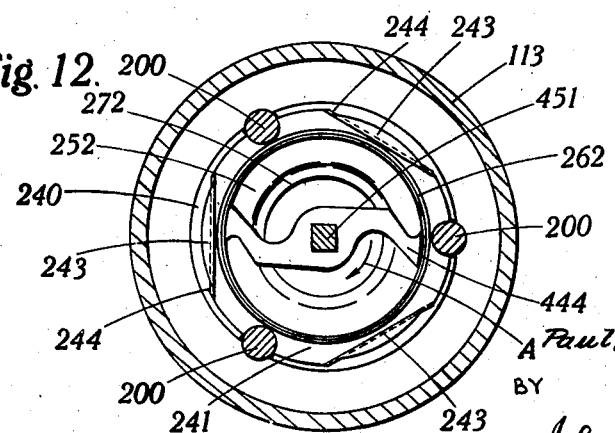
Figure 11:
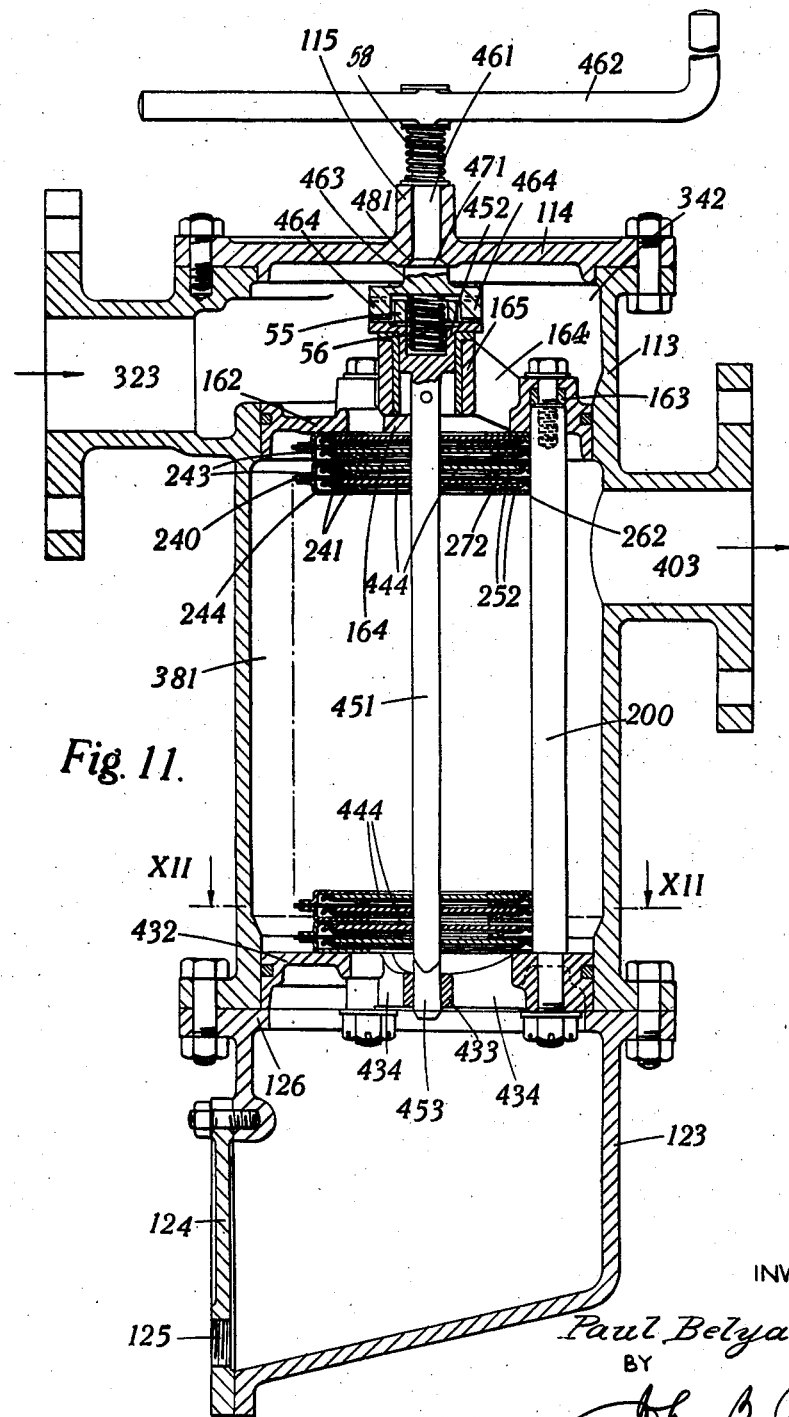

Fig. 3 is an axial section of a couple of filter elements similar to those shown in Figs. 1 and 2, Fig. 4 is an axial section of a modified filter including one form of cleaning means, Fig. 4a is a plan view of a single element of the cleaning means shown in Fig. 4, Fig. 5 is an axial section of another modified filter including a modified form of cleaning means, Fig. 5a is a plan view of a single element of the cleaning means shown in Fig. 5, Fig. 6 is an axial section of a horizontally disposed filter having modified filtering elements, Fig. 7 is a transverse section on the line VII—VII of Fig. 6, Fig. 8 is an enlarged transverse section on the line VIII—VIII of Fig. 6, Fig. 9 is an axial section of the filtering elements on the line IX—IX of Fig. 8, Fig. 10 is an exploded perspective view of a set of filter elements as shown in Figs. 8 and 9, Fig. 11 is an axial section of a vertically disposed large capacity filter incorporating cleaning means, and Fig. 12 is a transverse section on the line XII—XII of Fig. 11.

Throughout the following description like numerals indicate the same or similar parts.

In the embodiment shown in Fig. 1, the filter unit comprises a casing constituted by upper and lower parts 11 and 12. The lower part 12 constitutes a vessel for filtered fluid, and has at its upper end an external screw-threaded spigot 13 which engages in an internally screw-threaded skirt 14 depending from the upper part 11.

An annular flange 15 of a block member 16 is clamped between the upper end surface 17 of the lower casing member 12 and a shoulder 18 within the upper casing member 11. The block member 16 is internally screw-threaded co-axially with the casing members 11 and 12. This internal screw thread is engaged by the externally screw-threaded upper end 19 of a tubular member 20. As shown more clearly in Fig. 2, the tubular member 20 has four flats 22 into which radial apertures 21 open from the bore 23 of said member. The member 20 supports a series of filtering elements 24 and 25. The elements 24 are plane annular washers, and the elements 25, each of which is disposed below one of the plane elements 24, have upturned peripheral flanges 26, the edges of which engage the outer marginal portions of the plane elements 24 substantially perpendicularly. In Fig. 1 the margins 27 of the central apertures in the elements 25 are turned downwardly to project slightly from the lower surfaces of the annular portions of the elements, that is, in the opposite direction to the flanges 26. Thereby a small clearance is established between the lower transverse surfaces of the elements 25 and the upper surfaces of the adjacent elements 24.

Fig. 3 shows a slightly modified element 250, dished by the provision of a peripheral flange 260, and having a central portion 270 slightly depressed relative to the transverse portion of the element and parallel to the latter, affording a kind of sump for impurities extracted from the passing fluid in filtering.

The pile of annular elements is, as shown in Fig. 1, supported about the tubular member 20 betwen a shoulder 28 adjacent the lower end of the latter and a boss 29 on the lower surface of the block member 16. A compression spring may be disposed about the member 20 between the pile of elements and the shoulder 28 or the boss 29. The pressure exerted upon the pile of elements sets up oppositely acting forces at opposite margins of the elements, that is, downwardly acting forces on the outer margins of the elements 25 and upwardly acting forces on their inner margins, and upwardly acting forces on the outer margins of the elements 24 and downwardly acting forces on their inner margins.

The lower end of the member 20 is closed by a screwed plug 30 which supports a magnetised rod 31 co-axially within the member 20.

The upper part of the casing 11 has an internally screw-threaded aperture 32 for receiving a feed pipe for the fluid to be filtered. The aperture 32 communicates by way of a passage 33 with a feed chamber 34 enclosed between the block member 16 and a skirt 35 within the casing member 11. Further, the upper end of the block member 16 has an aperture 36 co-axial with the bore 23 of the tubular member 20 to enable fluid to be filtered to enter said bore from the feed chamber 34.

The flange 15 of the block member 16 has a peripheral series of apertures 37 whereby the space 38, surrounding the series of elements 24 and 25 and within the lower casing part 12, communicates with an annulus 39 in the upper casing part 11. This annulus is open to an aperture 40 internally threaded for receiving an outlet pipe for the filtered fluid.

The upper casing part 11 has at its upper end a milled screw 41 adapted to afford an air vent, and a drain plug 42 is screwed into the bottom of the lower casing part 12.

In the operation of the filter as described with reference to Fig. 1, a liquid or gas to be filtered is fed to the apparatus through a pipe secured in the aperture 32, whence it passes by the passage 33 to the feed chamber 34. It then passes through the aperture 36 in the top of the block 16 to the bore 23 of the tubular member 20 and out through the radial apertures 21 in the latter to the segmental spaces defined by the flat surfaces 22 of the member 20 and the inner peripheries of the elements 24 and 25. From these spaces it has free access to the spaces each enclosed by one of the plane elements 24 and the subjacent dished element 25.

A pressure drop is established across the bellows-like diaphragm constituted by the elements 24 and 25, either by applying pressure, as by a gravity head or by a feed pump, to the fluid inside the diaphragm, or by applying a negative pressure through the outlet aperture 40 and the communicating annulus 39 to the space 38 surrounding the diaphragm.

At a given pressure drop across the diaphragm, the fineness or coarseness of the filtering will be determined by the degree of compression of the pile of elements 24 and 25. It will be evident that the excess pressure of the fluid enclosed between each couple of elements 24 and 25, while tending to close the lips 27 at the inner peripheries of the elements 25 down upon the inner peripheries of the subjacent plane members 24 so as to prevent egress of fluid at this line, at the same time tends to flex the elements and separate the flanges 26 at the outer edges of the elements 25 from the lower marginal surfaces of the superposed plane elements 24. Filtering clearances are thereby afforded which enable the fluid to pass outwardly into the space 38 while solid bodies are held back and deposited within the dished members 25.

The maximum clearance which may be created between the flanges 26 and the plane members 24 is determined by the clearance between the lower transverse surface of each element 25 and the upper surface of the subjacent element 24. Evidently, therefore, if the tubular member 20 is so adjusted, by screwing its upper end 19 into the block 16, that the elements 25 are initially flexed until the clearance between their outer margins and the subjacent plane elements 24 averages for each couple, say, one, two or three thousandths of an inch or any other desired figure, then the maximum possible clearance which can be created between the flanges 26 and the superposed element 24 by the excess pressure within the diaphragm will be a corresponding figure. The size of the filtering clearances may thus be limited by a lesser or greater compression applied to the pile of elements by the member 20. Further, the clearances created are variable, within the maximum determined as aforesaid, with the magnitude of the excess pressure on the fluid within the diaphragm.

One slightly modified form of flanged element 250 has been illustrated in Fig. 3. This element has an inner sump afforded by the depressed margin 270 which serves for the collection of solid bodies extracted from the fluid. The elements 25 may alternatively be substituted by frusto-conical elements or by part-spherical elements. In a modified arrangement, the diaphragm may be constituted by opposed pairs of elements such as 25 or opposed pairs of conical or part-spherical elements, although this arrangement will be less efficient for the reason that in diaphragms of the same overall length, an arrangement as last mentioned will have fewer filtering apertures than the arrangement illustrated in Fig. 1. Another possible arrangement is to dispose in a pile, groups of elements, each group being constituted by a plane washer such as 24 which serves as a partition between an opposed pair of flexible elements such as 25 or 250 or the equivalent frusto-conical or part-spherical elements.

The filter shown in Fig. 4 is a modification of that shown in Fig. 1, having a filter assembly composed of the same types of elements 24 and 25 enclosed within a casing comprising socket and spigot parts 110 and 120, with an inlet aperture 320 and an outlet aperture 400 disposed in the part 110, the former aperture communicating with the interior of the assembly, so that filtering is effected outwards, and the latter aperture communicating with a space 380 about the assembly. The filter assembly is, however, supported by at least three rods 200 disposed symmetrically about the peripheries of the elements. A block member 160 has about a central aperture 360 an externally-threaded spigot 161 by which it is screwed into the casing part 110, and engages the upper ends of the rods 200. A member 43 constituting a sludge sump is secured to the lower end of the rods 200 and presses the assembly of filter elements 24, 25 upwards against the block 160.

Cleaning means for the filter assembly comprises a plurality of knives 44 (see also Fig. 4a) mounted on a square spindle 45. Each knife 44 is located in the space between a couple of the elements 24 and 25, and its thickness is slightly less than the axial distance between the surface of the element 24 and the adjacent parallel surface of the element 25, so that the resilient compression of the elements is not hindered by the presence of the knives. At its upper end, the spindle 45 is connected loosely for rotation with a key 46, which has a frusto-conical portion 47 pressed against a cone seating 48 in the casing part 110 by means of a compression coil spring 49 located between said portion and the spigot 161, to afford a fluid-tight bearing for the key.

Evidently, the operation of the filter shown in Fig. 4 is similar to that described with reference to Figs. 1 and 2. The fluid to be filtered enters by way of the aperture 320 and passes through the aperture 360 to the interior of the filter assembly. By virtue of a pressure drop across the assembly to the space 380, the elements 24 and 25 are flexed apart to establish filtering clearances at their outer margins through which the fluid passes to be drawn off in clean condition through the aperture 400. The provision of cleaning means enables gummy and other badly contaminated fluids to be dealt with. In order to prevent clogging of the filtering clearances, the key 46 is occasionally rotated, whereby the spindle 45 is caused to sweep the knives 44 round between the couples of elements 24, 25 and extract the sludge retained in the spaces between said elements, which sludge falls into the sump afforded by the member 43.

An advantageous feature of the filters with cleaning means as provided by the invention is that the knives are not disposed in the filtering clearances, so that said knives may be of robust construction. The actual clearances, being formed by the marginal portions of a couple of elements meeting with substantially knife-edge contact, require no cleaning, so that there is no need for the interposition of the cleaning knives between said marginal portions, and the necessarily coarse minimum clearance which would result from such interposition of knives is avoided.

Fig. 5 shows a filter similar to that shown in Fig. 4, but arranged for the passage of fluid through the filter assembly from the outside to the inside thereof. Filter elements 24 and 25 are disposed alternately in a pile about a tubular member 20 having external flat surfaces 22 and a plurality of apertures 21 extending radially to said surfaces from the bore 23 as described with reference to Figs. 1 and 2. The upper end of the member 20 is screwed directly into the casing part 111, and the filter elements are located between the lower surface of said part and an annular member 430 screwed to the lower end of the member 20. A plurality of cleaning knives 440 are disposed on an arm 450 connected to a key 46 for gyration about the axis of the filter. Each knife has a concave end surface 441 to afford two sharp scraping edges 442 as shown in Fig. 5a. The arm 450 is of square section, and the knives engage it by square apertures 443, to prevent turning of the knives about the arm.

In the operation of this filter, the fluid is supplied by way of the inlet aperture 321 to a feed space 340 within the bowl part 121 of the casing. By a pressure drop established across the filter assembly from the outside inwards, the adjacent elements 24, 25 are caused to flex apart at their inner margins for the establishment of filtering clearances. The filtered fluid enters the segmental spaces between the inner peripheries of the elements and the flat surfaces 22 of the member 20 (see Fig. 2) whence it flows by way of the apertures 21 to the bore 23 and the outlet aperture 401. The actual filtering clearances require no cleaning, as before, but when the spaces between the couples of elements 24, 25 are becoming clogged, the key 46 is rotated to pass the knives 440 about the elements, so that their edges 442 scrape off the deposited sludge, which falls into the lower end of the casing part 121, serving as a sump. It will be observed that the knives are arranged, as in Fig. 4, in the deep spaces between the elements 24 and 25, with the advantages above mentioned.

In the foregoing embodiments, the assembled filter elements 24 and 25 are subjected to a common compression stress which is transmitted from element to element along the pile, setting up oppositely acting forces at opposite margins of each element. Consequently, some of the individual filtering clearances may be less than others, although the average clearance is determined within very fine limits by the compression applied to the filter assembly as a whole. This variation of the clearance is an advantage in filters through which the same fluid periodically passes, as in the circulation system for the lubricating oil of an internal combustion engine. Coarser particles of carbon and other solid impurities are extracted at every passage of the fuel through the filter. Further, by the passage of a portion of the fluid through the finer clearances, the finer particles of impurities are likewise removed from that portion, and it has been found that all such finer particles are removed from the whole of the fluid in the course of a few passes through the filter. Thus, the ultimate filtration down to extremely fine limits is enabled, while the relatively larger average clearance throughout the filter assembly offers a less resistance to the passage of the fluid and thus maintains a high filtering capacity.

On the other hand, the invention also provides filtering means wherein the clearance of each couple or other group of filtering elements is individually determined. Thereby, filtering down to extremely fine limits can be effected in a single passage of a fluid through the filter unit, although it will be appreciated that the resistance offered by the unit is higher, and consequently the capacity is less than that of a filter as above described, for the same operative pressure head. Of course, the capacity in any of the filters increases or decreases directly with the difference of pressures at the inlet and outlet apertures.

Typical filters and filtering elements enabling individual adjustment of the clearances are shown in Figs. 6 to 12.

In Fig. 6, a filter assembly is composed of modified elements 241 and 251, which are here shown diagrammatically, but will later be described in detail. The assembly is supported, as in Fig. 4, by at least three rods 200 disposed symmetrically about the elements, the rods being connected at one end of the assembly to an annular member 160 and at the other end of the assembly to a member 431. A block 112 supports the filter assembly and the casing 122 within which said assembly is located. The block is symmetrical about a plane indicated by the line VII—VII, and presents two opposed parallel surfaces, one on each side of said plane. The externally threaded spigot 161 of the member 160 is screwed into an aperture 390 from one side of the block. An externally threaded annular plug 50 is screwed into the aperture 390 from the other side of the block. A tie rod 57 extends through the bore of the plug 50, which it closely fits, through the central aperture 360 of the member 160, with ample clearance for the passage of fluid, and through the member 431, which it also closely fits. The end of the tie rod 51 which projects through the member 431 is externally threaded and engaged by a wing nut 52 which bears upon the end of the casing 122 and presses it against a packing ring 53 embedded in the surface of the block 112. The end of the tie rod 51 which projects through the plug 50 is likewise screw threaded and engaged by a wing nut 52 which serves to press a cover 54 against another packing ring 53 in the opposite surface of the block 112.

Coaxially with the aperture 390, the block 112 has two arcuate transverse passages 341. A fluid inlet nipple 322 of known construction serves to supply fluid to be filtered to the upper of said passages, which is also provided with vent means constituted by a butterfly screw 410 having vent ducts 411. The lower passage 341 has a downward branch which is closed by a similar screw 420 having passages 421, which serves as a drain plug. A branch 391 from the central aperture 390 (see Fig. 7) receives a nipple assembly 402 serving for the outlet of filtered fluid. It will be evident from Fig. 6 that fluid entering by the nipple assembly 322 is enabled to flow freely from the upper of the passages 341 into the upper part of the casing 122 and also by way of the interior of the cap 54 and the lower passage 341 to the lower part of the casing 122, so as to freely and uniformly surround the filter assembly of elements 241, 251. After passing through the elements, the filtering fluid flows by way of the bore 360 in the element 160 to the aperture 390 in the block 112, from which it is removed by way of the outlet nipple assembly 402.

The arrangement shown in Figs. 6 and 7 is designed so that the filter capacity may, if desired, be doubled by removing the cover 54 and the rod 51, substituting for the former an additional filter element in an additional casing, which is secured by a substituted longer tie rod with a wing nut bearing on its end; in the course of such substitution the plug 50 is evidently to be replaced by the member 160 of the additional filter assembly.

The annular elements of the filter according to Fig. 6 are shown in greater detail and on a larger scale in Figs. 8 to 10. Each of the elements 241, which is basically circular, has in its outer periphery equiangularly disposed semi-circular recesses 242 for receiving the supporting rods 200. The peripheral portions 243 between the recesses 242 are pressed up to present three steps or axial walls 244 whereby the elements 241 are caused to serve as distance pieces. Each of the elements 241 also presents at its inner periphery a plane margin 245, adapted to co-operate with the adjacent element 251. The inner periphery of the latter is pressed to present a V-section ridge 261 which affords substantial knife edge contact with the inner margin 245 of the adjacent element 241. Further, the outer margin 271 of each element 251 is pressed out of the plane of the intermediate portion in the opposite direction to the ridge 261. The cross sectional form of the elements 251 can be clearly seen from Fig. 9. The total height of the ridge 261 above the adjacent surface of the depressed margin 271 is very slightly greater than the height of the step 244 in the element 241. Further, the internal radius of the outer marginal portion 271 is equal to the perpendicular distance from the inner surface of the axial wall or step 244 to the centre of the element 241. Thus, when the four grouped elements shown in Fig. 10 are pressed together, the inner ridge 261 of the lower element 251 bears downwardly on the inner margin 245 of the lower element 241, while the portions 243 of the latter bear upwardly on the outer marginal portion 271 of the element 251, and conversely in the case of the upper elements 251 and 241. The fluid to be filtered, which flows freely about the exterior of the elements, enters the spaces between each couple of elements 241 and 251 by way of the apertures between the rods 200 and the ends of the axial walls 244, whereby it gains free access to the whole of the outer slope of the ridge 261. The pressure of the fluid on this slope and on the intermediate portion of the elements 251 causes the latter to flex so that the ridge 261 is separated very slightly from the inner marginal surface 245 of the element 241 to afford the necessary filtering clearance. Evidently, since each of the elements 251 is firmly supported at three equiangularly disposed zones at its periphery between the portions 243 of the elements 241 (as shown in the upper part of Fig. 9), but is subjected to no other constraint, the amount of flexing of the element 251 to separate its ridge 261 from the element 241 is a function solely of its resilience and the pressure exerted upon it. The compression exerted upon the pile of elements is withstood by the stepped portions 244 of the elements 241, which by virtue of such steps are rendered substantially rigid when assembled. Accordingly, no stress can be transmitted from one to another of the elements 251, and the filtering clearance created between each of said elements and the element 241 with which it co-operates is individually determined, so that with reasonable accuracy of manufacture and uniformity of the material from which the elements are made, the filtering clearances at any particular pressure drop across the filter are uniform throughout the assembly.

Figs. 11 and 12 show in axial and transverse sections, on a much reduced scale, an industrial filter having a filtering assembly of the general type described with reference to Figs. 8 to 10, that is, arranged to enable individual control of the filtering clearances, but modified by the incorporation of mechanical cleaning means. The casing is chiefly constituted by a tubular body 113 integrally having an inlet branch 323 and an outlet branch 403. The body 113 also comprises a feed chamber 342, which is in direct communication with the inlet branch 323, and a discharge space 381, which is in direct communication with the outlet branch 403, the filter assembly being housed within said space 381, that is, within the confines of the body 113. Said member is closed at the upper end by a detachable cover 114 and at the lower end by a casing part 123 affording a sump provided with a detachable cleansing door 124, which incorporates a screw threaded drain plug aperture 125. The filter assembly is constituted by a plurality of groups of elements each comprising in succession an element 241 (as shown in Fig. 10), an element 252 (similar to the element 251 shown in Fig. 10 but having a ridge 262 at its outer edge and a depressed inner margin 272), a plane element 240 (similar to the element 24, Figs. 2 and 3, but having three recesses such as 242, Fig. 10, in its outer edge), another element 251 and another element 241. The two elements 241 are oppositely directed so that their outer marginal portions 243 bear on opposite sides of the outer margin of the element 240, and the elements 252 are disposed with their ridges 262 directed upwards to bear respectively on the undersides of the upper element 241 and the element 240, while the inner marginal portions 272 of the elements 252 bear downwards respectively on the inner margins of the element 240 and the lower element 241. The filter elements are located in a pile by means of three rods 200 disposed equidistantly about the elements, engaging in the semi-circular recesses 242 in the elements 241 and 240, and bearing against the outer peripheries of the elements 252. These rods are connected at their lower end to an annular member 432 which rests upon an internal annular shoulder 126 at the upper edge of the sump member 123 to locate the filter assembly. At their upper ends the rods 200 are connected to an annular member 162 with the interposition of packing means 163 the axial length of which may be varied to adjust the distance between the adjacent surfaces of the elements 432 and 162 to the exact height of the pile of elements. The member 162 has three inwardly projecting arms 164 supporting a boss 165 in which the upper end of a spindle 451 is rotatably located by means of an enlarged head 452 having two diametrically opposed lugs (not shown) whereby it is enabled to serve as an element of a dog clutch. The spindle 451 is of square section for engaging double ended cleaning knives 444 (see Fig. 12) located above each of the filter elements 252. The lower end 453 of the spindle 451 is rounded and mounted in a boss 433 supported by three arms 434 projecting radially inwards from the annular member 432.

In a central boss 115 of the cover 114 there is mounted a key 461 having a detachable handle 462. The head 463 of this key is provided with two diametrically opposed lugs 464 whereby it is enabled to serve as another dog clutch element, the lugs 464 and the corresponding lugs (not shown) on the head 452 of the spindle 451 being inserted in the slots of a coupling member 55 of Maltese cross form so that they are free for diametrical and axial sliding, but closely constrained in both rotational directions. A spring 56 is interposed between the clutch elements 452 and 463 to press the former firmly down upon its bearing in the boss 165 and the latter firmly upwards, so that a frusto-conical shoulder 471 immediately above it engages a conical seat 481 in the cover 114 to afford a fluid-tight seal. A compression spring 57, located about the shank of the key 461, between the handle 462 and the boss 115 through which said shank passes, assists the spring 56 in maintaining the engagement of the conical surfaces 471 and 481. By the arrangement of the dog clutch as described, the axial location of the spindle 451 within the assembly of filter elements is ensured regardless of any eccentricity or mis-alignment of the boss 115 in the cover 114 or misplacement of the latter, and the exertion of endwise pressure on the spindle 451 with consequential axial frictional drag on the knives 444 is avoided In the operation of this filter, fluid supplied to the inlet aperture 323 passes from the supply chamber 342 in the upper part of the casing 113, between the arms 164 to the interior of the filter assembly, and to the spaces between the elements 252 and the superposed elements 240 or 241. By virtue of the pressure drop across the filter clearances which are constituted by the substantial knife edge engagement of the ridges 262 of the elements 252 with the lower plane surfaces of the elements 240 and 241, the elements 252 are caused to flex away from said surfaces to enable the passage and filtration of the fluid. Evidently, each of the elements 252 is located in a space the depth of which is rigidly determined by the stepwise wall portions 244 of one of the elements 241, so that the individual filtering clearances are predetermined by the resilience of the elements 252 and the pressure head applied to the fluid to be filtered. The filtered fluid is withdrawn by way of the outlet aperture 403 from the space 381, surrounding the filter assembly, with which said aperture communicates.

It will be seen from Fig. 11 that the fluid to be filtered may pass between the arms 434 of the lower end member 432 to the interior of the casing part 123 which constitutes a sump. When the spaces between the elements 252 and the superposed elements 240 or 241 are becoming clogged with sludge extracted by the filtering operation, the handle 461 of the key 462 is rotated in the direction of the arrow A (Fig. 12), whereby the knives 444 are rotated in said spaces and sweep the sludge towards the middle of the filter assembly so that it sinks through the contained fluid and passes into the fluid standing in the sump part 123, where it settles as a sediment. This sediment may be drained off by removal of the drain plug from the aperture 125 without interrupting the operation of the filter, or the door 124 may be removed to enable the scouring out of the sump part 123 after the supply of fluid has been cut off, but without dismantling the filter. Further, it will be appreciated that by removal of the cover 114, which consequently removes the key 461, access is gained to the filter assembly, which with its locating rods 200, the end members 162 and 432 and the knife spindle 451 can be withdrawn through the upper end of the casing part 113 for cleaning, replacement of filtering elements or knives, or other attention.

Evidently, in the place of a centrally disposed tubular member, or a plurality of externally disposed rods supporting the assembly of filter elements, a freely perforated tube, disposed either internally or externally of the elements, may be employed, the diameter of the tube being such as to effect exact lateral confinement of the elements.

It will be appreciated that the invention provides filters in various forms which are highly efficient, and can be adjusted for performing filtering to a degree of fineness that has hitherto not been attainable. Moreover, these advantages are coupled with great facility in the washing of the filters, and ease of replacement of worn or damaged filter elements or cleaning knives.

I claim:

1. A filter for purifying fluids, having a series of cooperating couples of annular elements disposed in a vertical pile, at least one supporting member extending longitudinally of the pile constraining said elements against radial displacement, and end members connected to said supporting member, the upper element of each couple being substantially plane and the lower element of each couple having at one peripheral margin a turned-up flange engaging the whole coacting margin of said plane element substantially perpendicularly and at its opposite peripheral margin a depressed portion engaging the plane element of the subjacent couple, said substantially plane elements being relatively more rigid than said flanged elements, said end members pressing said elements together axially to set up oppositely acting forces at said opposite margins of said lower elements, said supporting member and said end members being mutually adjustable for varying the compression of said elements, and said couples of elements being separable at their mutually engaging margins by flexing under the pressure of passing fluid to afford filtering clearance.

2. A filter for purifying fluids, comprising, in combination, a casing, inlet and outlet apertures in said casing, a series of co-operating couples of annular elements disposed in a pile, each intermediate element of said series engaging at an angle by one of its margins the other element of the same couple and engaging by an opposite margin the nearer element of the adjacent couple, at least one supporting member extending longitudinally of the pile constraining said elements against radial displacement, and end members connected to said supporting member, said end members pressing said elements together axially to set up oppositely acting forces at said opposite margins of the elements, and said couples of elements being separable at their mutually engaging margins by flexure under the pressure of passing fluid to afford filtering clearance, said associated supporting and end members with said elements being mounted within said casing, means affording passage from said inlet aperture to one side of said pile of elements, and means affording passage from the other side of said pile of elements to said outlet aperture, turnably displaceable cleaning knives extending radially one between the elements of each couple at the side of the pile in communication with said inlet aperture, and means supporting said knives and extending through said casing at the axis of said pile to enable turning of said knives from outside said casing, the free ends of said knives terminating adjacent the inlet side of said mutually engaging margins.

3. A filter for purifying fluids, having a series of annular resilient elements disposed in a pile, means supporting said elements, said supporting means including at least one member extending longitudinally of the pile constraining said elements against radial displacement and end members connected to said axially extending member constraining said elements axially each outer element of said pile engaging one of said end members by one of its peripheral margins and engaging the adjacent element by its opposite peripheral margin, each intermediate element engaging one adjacent element by one of its peripheral margins and engaging the other adjacent element by its opposite peripheral margin, said elements reacting each by exerting opposite forces at said opposite margins, and each of said elements being flexibly separable from the element engaged thereby at one of said margins under the pressure of passing fluid to afford a filtering clearance at one of said margins, turnably displaceable cleaning knives extending radially between said elements, the free ends of said knives terminating adjacent the inlet sides of said separable margins, and means supporting said knives and enabling turning thereof.

4. A filter for purifying fluids, having a series of co-operating couples of annular elements disposed in a pile, at least one supporting member extending longitudinally of the pile constraining said elements against lateral displacement, and end members connected by said supporting member, one element of each couple being substantially plane and the other element of each couple having at one peripheral margin a turned-up flange engaging the whole co-acting margin of said plane element substantially perpendicularly and at its opposite peripheral margin a depressed portion engaging the plane element of the adjacent couple, said end members pressing said elements together axially to set up oppositely acting forces at said margins of said flanged elements, said couples of elements being separable at their mutually engaging margins by flexure under the pressure of passing fluid to afford filtering clearance, turnably displaceable cleaning knives extending radially one between the elements of each couple, the free ends of said knives terminating adjacent the inlet sides of said mutually engaging margins, and means supporting said knives and enabling turning thereof.

5. A filter for purifying fluids, comprising, in combination, a casing, inlet and outlet apertures in said casing, a series of co-operating couples of annular elements disposed in a vertical pile, at least one supporting member extending longitudinally of the pile constraining said elements against radial displacement, and end members connected to said supporting member, the upper element of each couple being substantially plane and the lower element of each couple having at one peripheral margin a turned-up flange engaging the whole coacting margin of said plane element substantially perpendicularly and at its opposite peripheral margin a depressed portion engaging the plane element of the subjacent couple, said substantially plane elements being relatively more rigid than said flanged elements, said end members pressing said elements together axially to set up oppositely acting forces at said opposite margins of said lower elements, said couples of elements being separable at their mutually engaging margins by flexure under the pressure of passing fluid to afford filtering clearance, said associated supporting and end members with said elements being mounted within said casing, means affording passage from said inlet aperture to one side of said pile of elements, and means affording passage from the other side of said pile of elements to said outlet aperture, turnably displaceable cleaning knives extending radially between said elements at the side of the pile in communication with said inlet aperture and means supporting said knives and extending through said casing at the axis of said pile to enable turning of said knives from outside said casing, the free ends of said knives terminating adjacent the inlet side of said margins separable to afford filtering clearance.

6. A filter for purifying fluids, comprising, in combination, a casing, inlet and outlet apertures in said casing, a series of annular elements disposed in a pile, at least one supporting member extending longitudinally of the pile and constraining said elements against radial displacement and end members connected by said supporting member, each outer element of said pile engaging one of said end members by one of its peripheral margins and engaging the adjacent element by its opposite peripheral margin, each intermediate element engaging one adjacent element by one of its peripheral margins and engaging the other adjacent element by its opposite peripheral margin, said end members pressing said elements together axially to set up oppositely acting forces at said opposite margins of the elements, and at least some of said elements being resiliently flexible under the pressure of passing fluid to afford filtering clearances at their inner margins, said supporting and end members with said elements being mounted within said casing, means affording passage from said inlet aperture to the outside of said pile, means affording passage from the inside of said pile to said outlet aperture, turnably displaceable cleaning knives extending radially inwards between said elements, the free ends of said knives terminating adjacent the outer sides of said inner margins, and means supporting said knives and extending through said casing at the axis of said pile, said means being turnable to enable gyration of said knives about said pile.

7. A filter for purifying fluids, having a series of co-operating couples of annular elements disposed in a pile, at least one supporting member extending longitudinally of the pile and constraining said elements against radial displacement, and end members connected by said supporting member, one element of each couple being substantially plane and the other element of each couple having at one peripheral margin a turned-up flange engaging the whole coacting margin of said plane element substantially perpendicularly and at its opposite peripheral margin a depressed portion engaging the plane element of the adjacent couple, said end members pressing said elements together axially to set up oppositely acting forces at said opposite margins of said flanged elements, said couples of elements being separable at their mutually engaging margins by flexure under the pressure of passing fluid to afford filtering clearance at their inner margins, turnably displaceable cleaning knives extending radially inwards between the elements of each couple, the free ends of said knives terminating adjacent the outer sides of said inner margins, and means mounting said knives and turnable about the axis of said pile to effect gyration of said knives about said pile.

8. A filter for purifying fluids having a series of annular elements disposed in a pile, at least some of said elements being resiliently flexible and having each an up-turned portion about its outer peripheral margin and a depressed portion about its inner peripheral margin with an intermediate portion substantially normal to the axis of the pile, each of said flexible elements engaging the adjacent elements with continuous peripheral contact respectively by said up-turned and depressed portions, means pressing the elements together longitudinally, and means supplying fluid to be filtered between said intermediate portions and the superposed elements, the up-turned portions and the elements which they engage being longitudinally separable to afford filtering clearances under the pressure of passing fluid, and each of said flexible elements and the adjacent element which it engages by its depressed portion constituting under the separation mutual abutments limiting the maximum filtering clearances obtainable.

9. A filter for purifying fluids having a series of co-operating couples of elements disposed in a pile, one element of each couple being plane, the other element of each couple being resiliently flexible and having an up-turned portion about its outer peripheral margin and a depressed portion about its inner peripheral margin with an intermediate portion substantially normal to the axis of the pile, said up-turned and depressed portions severally engaging with continuous peripheral contact the plane elements of the same couple and of the adjacent couple, at least one supporting member extending longitudinally of the pile constraining said elements against radial displacement, end members connected to said supporting member and pressing the elements together longitudinally, and means supplying fluid to be filtered between the elements of each couple, the co-operating margins of each couple of elements being longitudinally separable to afford filtering clearance under the pressure of passing fluid and each element adjacent to the more flexible element of another couple being disposed to constitute an abutment to limit the longitudinal displacement of the separable margin of said more flexible element and the maximum filtering clearance thereby obtainable.

10. A filter for purifying fluids having a series of annular elements disposed in a pile, some of said elements being resiliently flexible and having each at its inner and outer peripheral margins respectively a ridge and a flange displaced respectively in the opposite longitudinal directions with an intermediate portion substantially normal to the axis of the pile, the remaining elements of the pile being rigid and presenting plane surfaces for engagement with continuous peripheral contact by said ridges and flanges, at least some of said rigid elements having longitudinally turned lugs engageable with others of said rigid elements, at least one supporting member extending longitudinally of the pile constraining said elements against radial displacement, end members connected to said supporting member and compressing the pile of elements to the limit imposed by the mutual engagement of the rigid elements, and means supplying fluid to be filtered between said intermediate portions and at least some of the rigid elements, the ridges on the flexible elements engaging said last-recited rigid elements being longitudinally separable therefrom to afford filtering clearances under the pressure of the fluid supply, and the rigid elements engaged by the displaced flanges of the flexible elements constituting abutments limiting the maximum filtering clearances obtainable.

11. A filter for purifying fluids, having a series of co-operating couples of annular elements disposed in a vertical pile, at least one supporting member extending longitudinally of the pile constraining said elements against radial displacement, end members connected to said supporting member, means supplying fluid for filtering to the interior of the pile, the upper element of each couple being substantially plane, the lower element of each couple being resiliently flexible, having at its outer peripheral margin a turned-up flange and at its inner peripheral margin a depressed portion with an intermediate portion substantially normal to the axis of the pile, said turned-up flange engaging the whole coacting margin of the plane element of the same couple, said depressed portion engaging the whole coacting margin of the plane element of an adjacent couple, said end members pressing said elements together axially to set up oppositely acting forces at said opposite margins of said lower elements, and said couples of elements being separable at their mutually outer engaging margins by flexure of the resilient elements under the pressure of passing fluid to afford filtering clearance.

12. A filter for purifying fluids comprising, in combination, a casing constituted by a block part and at least one bowl part, fluid inlet and outlet unions in said block part, at least one series of co-operating couples of annular elements disposed in a vertical pile, at least one supporting member extending longitudinally of the pile and engaging the elements to constrain them against radial displacement and end members conected by said supporting member, the upper element of each couple being substantially plane and the lower element of each couple being flexibly resilient, having at its inner peripheral margin a turned-up flange and at its outer peripheral margin a depressed portion with an intermediate portion substantially normal to the axis of the pile, said turned-up flange engaging the whole coacting margin of the plane element of the same couple, said depressed portion engaging the whole coacting margin of the plane element of an adjacent couple, said supporting member and said end members being initially adjustable for varying the compression of said elements, said couples of elements being separable at their mutually engaging margins by flexure of the resilient elements under the pressure of passing fluid to afford filtering clearance, one of the end members which constrains said pile being secured to said block part so that said pile and said supporting member and the other of the end members constraining said pile are housed in said bowl part, means affording passage through said block part from said inlet union to the outer side of said pile, and means affording passage from the inner side of said pile through said block part to said outlet union.

PAUL BELYAVIN.